(12) United States Patent
Tamamura (10) Patent No.: US 7,207,218 B2
(45) Date of Patent: Apr. 24, 2007

(54) LIQUID RESIDUAL QUANTITY DETECTING METHOD, LIQUID RESIDUAL QUANTITY DETECTING DEVICE, PROGRAM FOR IMPLEMENTING THE METHOD, AND STORAGE MEDIUM STORING THE PROGRAM

(75) Inventor: Hideo Tamamura, Kanagawa (JP)

(73) Assignee: Canon Kabushiki Kaisha (JP)

( * ) Notice: Subject to any disclaimer, the term of this patent is extended or adjusted under 35 U.S.C. 154(b) by 135 days.

(21) Appl. No.: 11/010,709

(22) Filed: Dec. 13, 2004

(65) Prior Publication Data

US 2005/0130012 A1  Jun. 16, 2005

(30) Foreign Application Priority Data

Dec. 11, 2003  (JP)  ............... 2003-413859

(51) Int. Cl.
*G01F 23/00* (2006.01)
(52) U.S. Cl. ...................................... 73/291
(58) Field of Classification Search ............. 73/291, 73/290 B, 293, 314; 116/227; 340/450.2
See application file for complete search history.

(56) References Cited

FOREIGN PATENT DOCUMENTS

| JP | 60235025 A | * | 11/1985 |
|---|---|---|---|
| JP | 9-257550 A | | 10/1997 |
| JP | 11-190655 A | | 7/1999 |
| JP | 2002-56857 A | | 2/2002 |
| JP | 2002-100376 A | | 4/2002 |

* cited by examiner

*Primary Examiner*—Hezron Williams
*Assistant Examiner*—Tamiko Bellamy
(74) *Attorney, Agent, or Firm*—Rossi, Kimms & McDowell LLP (57) ABSTRACT

A liquid residual quantity detecting method which is capable of accurately detecting the residual quantity of a liquid in an apparatus without being affected by the position of the apparatus, to thereby prevent a user from carelessly or erroneously believing that the liquid still remains. A fuel residual quantity detector detects the residual quantity of a fuel stored in a fuel storage chamber 109a of a fuel cell 108 of a camera 100. A microcomputer 205 provides control such that an operation for detecting the residual quantity of the fuel is executed only when the camera 100 is in its normal position.

8 Claims, 8 Drawing Sheets

LIQUID RESIDUAL QUANTITY DETECTING METHOD, LIQUID RESIDUAL QUANTITY DETECTING DEVICE, PROGRAM FOR IMPLEMENTING THE METHOD, AND STORAGE MEDIUM STORING THE PROGRAM

BACKGROUND OF THE INVENTION

1. Field of the Invention

The present invention relates to a liquid residual quantity detecting method for detecting a residual quantity of a liquid, such as a liquid fuel for use in a fuel cell for driving an image pickup apparatus (camera), a portable apparatus, or a like electronic apparatus, a liquid residual quantity detecting device for executing the method, a program for implementing the method, and a storage medium storing the program.

2. Description of the Related Art

Recently, there have been proposed various kinds of image pickup apparatuses and portable apparatuses, as electronic apparatuses using a fuel cell as a power supply driving the same.

As fuel cells for electronic apparatuses, there has been proposed a fuel cell that generates electric power by directly supplying a liquid organic fuel, such as methanol, to its anode (see e.g. Japanese Laid-Open Patent Publication (Kokai) No. 2002-056857).

The proposed fuel cell is simple in construction since it does not necessitate a reformer for reforming the liquid organic fuel, such as methanol, into a hydrogen-rich reformed gas, and is therefore regarded as a promising power supply for portable apparatuses.

Now, a brief description will be given of the principle of power generation by the fuel cell of the above-mentioned type. The fuel cell (DMFC) is usually operated by supplying air to its cathode and supplying an organic fuel to its anode, which causes a chemical reaction expressed by the following formula (1):

$$CH_3OH + H_2O \rightarrow CO_2 + 6H^+ + 6e^- \quad (1)$$

Then, protons ($H^+$) generated on the anode side move to the cathode side through a solid polymer membrane as electrolyte to react with oxygen atoms from the air as expressed by the following formula (2):

$$O_2 + 4H^+ + 4e^- \rightarrow 2H_2O \quad (2)$$

Carbon dioxide and water are generated upon generation of electric power.

The fuel cell is advantageous not only in the capability of generating electric power simply by supplying fuel and an oxidizer but also in the capability of continuously generating electric power by refilling fuel. Compared with a secondary battery which takes several hours to be charged, it can be said that the fuel cell is restored almost instantaneously. In addition, the fuel cell has a big advantage in its suitability for driving portable apparatuses with small power consumption.

However, since the fuel cell uses liquid fuel which moves depending on the position of a portable apparatus in which it is used, there is a demand for means for correctly detecting the residual quantity of the fuel.

Conventionally, there has been proposed a fuel storage system configured to store an increased amount of liquid fuel for fuel cells within a portable apparatus (see e.g. Japanese Laid-Open Patent Publication (Kokai) No. 2002-100376).

Further, there has conventionally been proposed a fuel gauge structure for fuel gauges of automotive vehicles, which is capable of informing a user that the residual quantity of fuel cannot be correctly indicated due to inclination of a vehicle body (see e.g. Japanese Laid-Open Patent Publication (Kokai) No. H09-257550).

Furthermore, there has conventionally been proposed a fuel residual quantity display device for vehicles, which is hardly affected by the position of the vehicle but is capable of correctly indicating the residual quantity of fuel even when the vehicle is not in a horizontal position, i.e. is in a tilted position (see e.g. Japanese Laid-Open Patent Publication (Kokai) No. H11-190655).

However, the above-described conventional techniques have the following drawbacks:

The fuel storage system disclosed in Japanese Laid-Open Patent Publication (Kokai) No. 2002-100376 uses a fuel cell unit for portable apparatuses, but has been proposed to provide a novel layout of a fuel tank, and therefore the publication does not describe at all the detection of the residual quantity of fuel, warning of the residual quantity of fuel, or replacement of fuel cells.

In the fuel gauge structure disclosed in Japanese Laid-Open Patent Publication (Kokai) No. H09-257550, the residual quantity of fuel is constantly displayed whether it may be correct or incorrect. Therefore, it is difficult to determine at a glance whether or not the indication of the fuel residual quantity is correct.

Further, the fuel residual quantity display device for vehicles disclosed in Japanese Laid-Open Patent Publication (Kokai) No. H11-190655 is capable of correctly indicating the residual quantity of fuel even when the vehicle is tilted, but this device needs not only a detecting means for detecting tilt of the vehicle, but also other various means, such as a storage means, a holding means, and a control means, which inevitably increases manufacturing costs, increases the size, and makes the device complicated in construction.

SUMMARY OF THE INVENTION

It is an object of the present invention to provide a liquid residual quantity detecting method, a liquid residual quantity detecting device, and a program for implementing the method, which are capable of accurately detecting the residual quantity of a liquid in an apparatus without being affected by the position of the apparatus or a device using the liquid, to thereby prevent a user from carelessly or erroneously believing that the liquid still remains, and a storage medium storing the program.

To attain the above object, in a first aspect of the present invention, there is provided a liquid residual quantity detecting method of detecting a residual quantity of a liquid stored in a liquid storage section provided in an apparatus comprising a control step of providing control such that an operation for detecting the residual quantity of the liquid is executed only when the apparatus is in a predetermined position.

Preferably, the predetermined position is a normal position of the apparatus.

Preferably, the liquid is a liquid fuel used by a fuel cell as a power supply for the apparatus to generate electric power.

Preferably, the apparatus is an image pickup apparatus.

Preferably, the apparatus is a portable apparatus.

To attain the above object, in a second aspect of the present invention, there is provided a liquid residual quantity detecting method of detecting a residual quantity of a liquid stored in a liquid storage section provided in an apparatus comprising a control step of providing control such that execution of an operation for detecting the residual quantity of the liquid is inhibited except when the apparatus is in a predetermined position.

To attain the above object, in a third aspect of the present invention, there is provided a liquid residual quantity detecting method of detecting a residual quantity of a liquid stored in a liquid storage section provided in an apparatus, comprising a liquid residual quantity detecting step of detecting the residual quantity of the liquid, a position detecting step of detecting a position of the apparatus, and a control step of providing control such that an operation for detecting the residual quantity of the liquid in the liquid residual quantity detecting step is executed only when it is detected in the position detecting step that the apparatus is in a predetermined position.

Preferably, the liquid residual quantity detecting method further comprises a display step of displaying the residual quantity of the liquid detected in the liquid residual quantity detecting step on a display section of the apparatus and a display control step of providing control such that execution of display of the residual quantity of the liquid in the display step is inhibited when the operation for detecting the residual quantity of the liquid is not executed in the liquid residual quantity detecting step.

Preferably, positions of the apparatus tilted in a front-rear direction and in a lateral direction with respect to a normal position of the apparatus are detected in the position detecting step.

To attain the above object, in a fourth aspect of the present invention, there is provided a liquid residual quantity detecting method of detecting a residual quantity of a liquid stored in a liquid storage section provided in an apparatus comprising a liquid residual quantity detecting step of detecting the residual quantity of the liquid, a position detecting step of detecting a position of the apparatus, and a control step of providing control such that execution of an operation for detecting the residual quantity of the liquid in the liquid residual quantity detecting step is inhibited except when it is detected in the position detecting step that the apparatus is in a predetermined position.

To attain the above object, in a fifth aspect of the present invention, there is provided a liquid residual quantity detecting device for detecting a residual quantity of a liquid stored in a liquid storage section provided in an apparatus comprising a controller that provides control such that an operation for detecting the residual quantity of the liquid is executed only when the apparatus is in a predetermined position.

Preferably, the predetermined position is a normal position of the apparatus.

Preferably, the liquid is a liquid fuel used by a fuel cell as a power supply for the apparatus to generate electric power.

Preferably, the apparatus is an image pickup apparatus.

Preferably, the apparatus is a portable apparatus.

To attain the above object, in a sixth aspect of the present invention, there is provided a liquid residual quantity detecting device for detecting a residual quantity of a liquid stored in a liquid storage section provided in an apparatus comprising a controller that provides control such that execution of an operation for detecting the residual quantity of the liquid is inhibited except when the apparatus is in a predetermined position.

To attain the above object, in a seventh aspect of the present invention, there is provided a liquid residual quantity detecting device for detecting a residual quantity of a liquid stored in a liquid storage section provided in an apparatus comprising a liquid residual quantity detector that detects the residual quantity of the liquid, a position detector that detects a position of the apparatus, and a controller that provides control such that an operation for detecting the residual quantity of the liquid by the liquid residual quantity detector is executed only when the position detector detects that the apparatus is in a predetermined position.

Preferably, a liquid residual quantity detecting device further comprises a display device that displays the residual quantity of the liquid detected by the liquid residual quantity detector on a display section of the apparatus and a display controller that provides control such that execution of display of the residual quantity of the liquid by the display device is inhibited when the operation for detecting the residual quantity of the liquid is not executed by the liquid residual quantity detector executing.

Preferably, the position detector detects positions of the apparatus tilted in a front-rear direction and in a lateral direction with respect to a normal position of the apparatus.

To attain the above object, in an eighth aspect of the present invention, there is provided a liquid residual quantity detecting device for detecting a residual quantity of a liquid stored in a liquid storage section provided in an apparatus comprising a liquid residual quantity detector that detects the residual quantity of the liquid, a position detector that detects a position of the apparatus, and a controller that provides control such that execution of operation for detecting the residual quantity of the liquid by the liquid residual quantity detector is inhibited except when the position detector detects that the apparatus is in a predetermined position.

To attain the above object, in a ninth aspect of the present invention, there is provided a computer-readable program for implementing a liquid residual quantity detecting method of detecting a residual quantity of a liquid stored in a liquid storage section provided in an apparatus comprising a control module for providing control such that an operation for detecting the residual quantity of the liquid is executed only when the apparatus is in a predetermined position.

To attain the above object, in a tenth aspect of the present invention, there is provided a storage medium storing a computer-readable program for implementing a liquid residual quantity detecting method of detecting a residual quantity of a liquid stored in a liquid storage section provided in an apparatus, the program comprising a control module for providing control such that an operation for detecting the residual quantity of the liquid is executed only when the apparatus is in a predetermined position.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

First, a description will be given of an embodiment of the present invention with reference to FIGS. 1 to 11.

Figure 1:
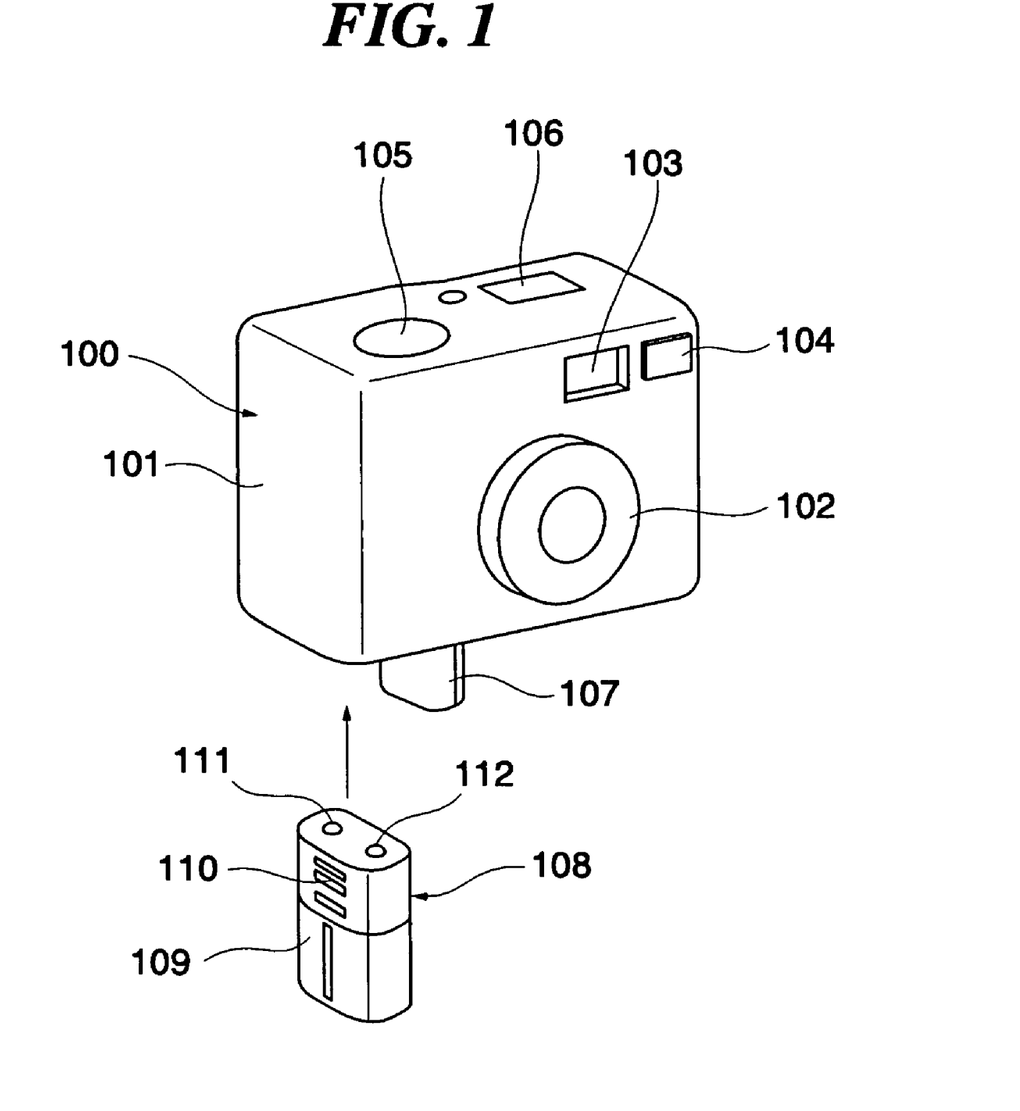
FIG. 1 is a perspective view showing the appearance of a camera incorporating a fuel residual quantity detecting device as a liquid residual quantity detecting device according to an embodiment of the present invention.
Figure 2:
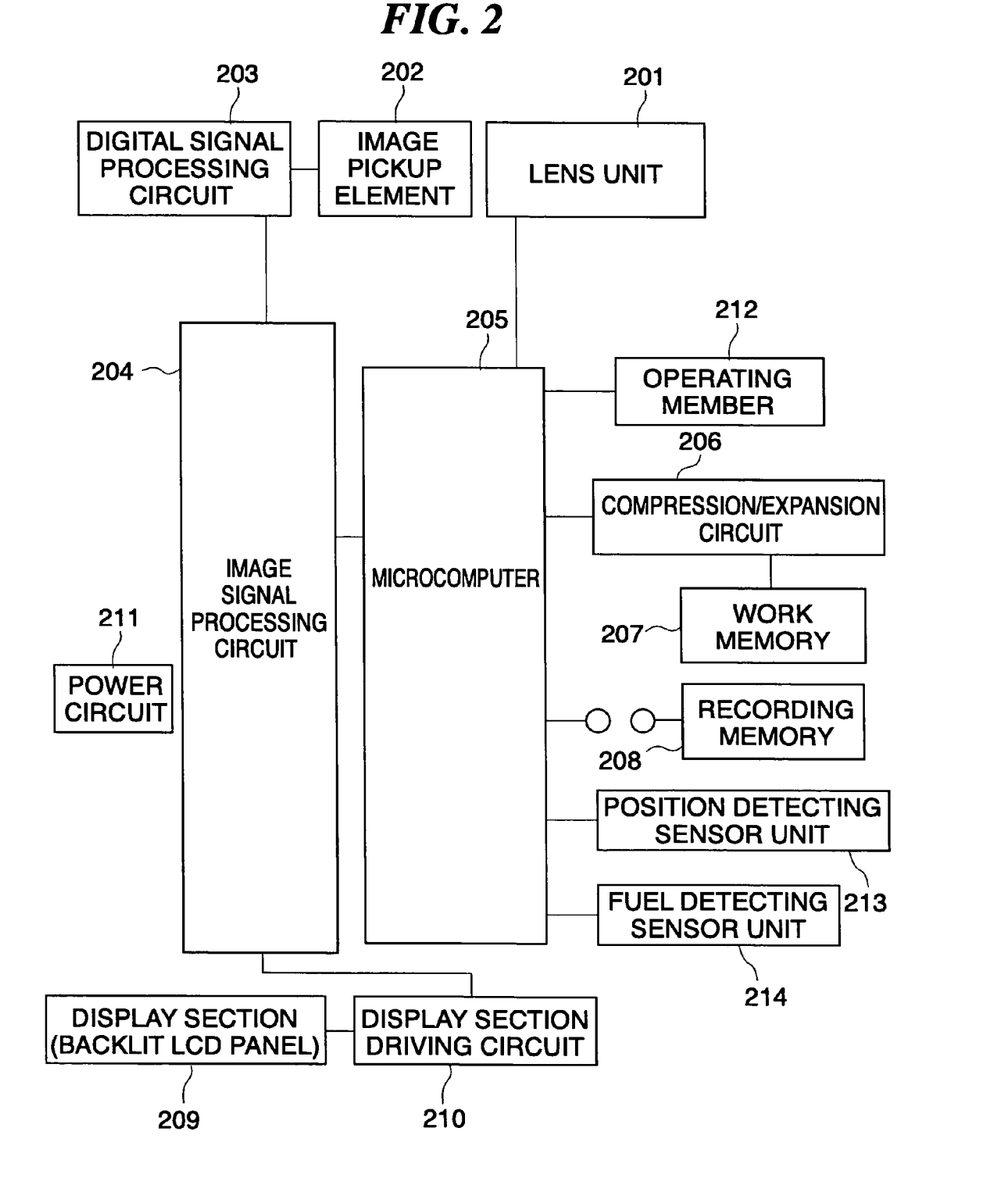
FIG. 2 is a block diagram showing the internal arrangement of the camera in FIG. 1.
Figure 9A:
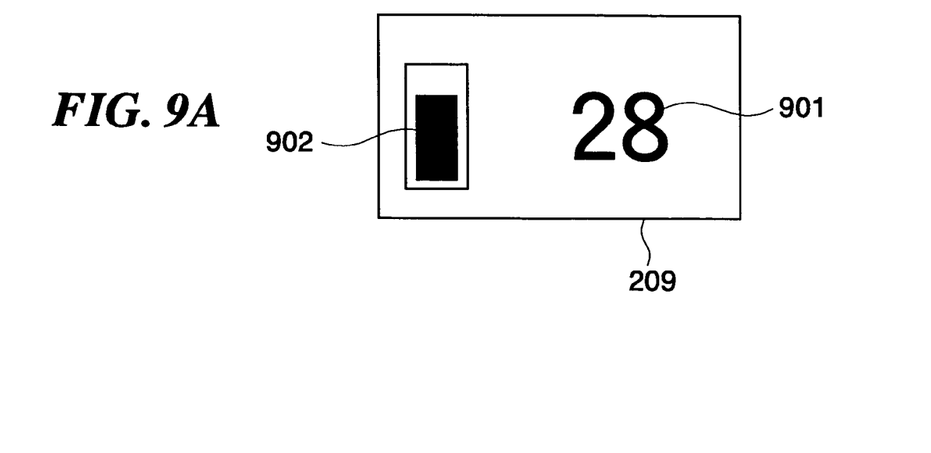
FIGS. 9A, 9B and 9C are views showing examples of display on a display section of the camera in FIG. 1.
Figure 9B:
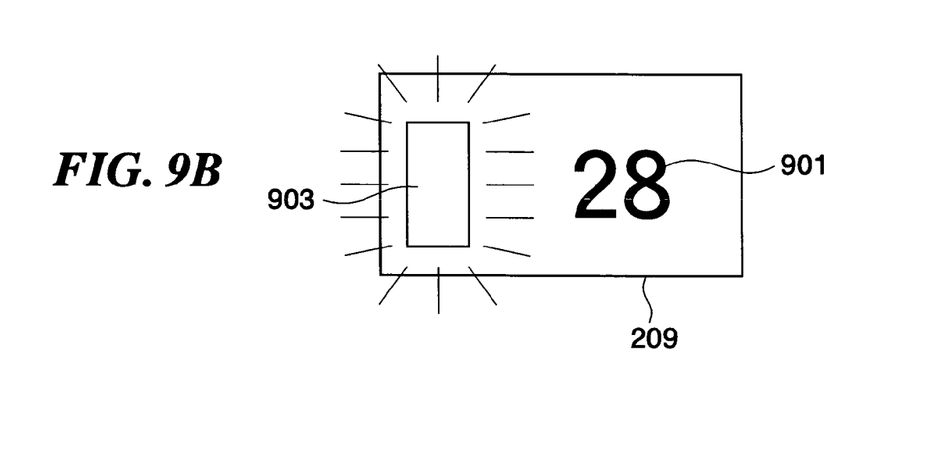
Figure 9C:
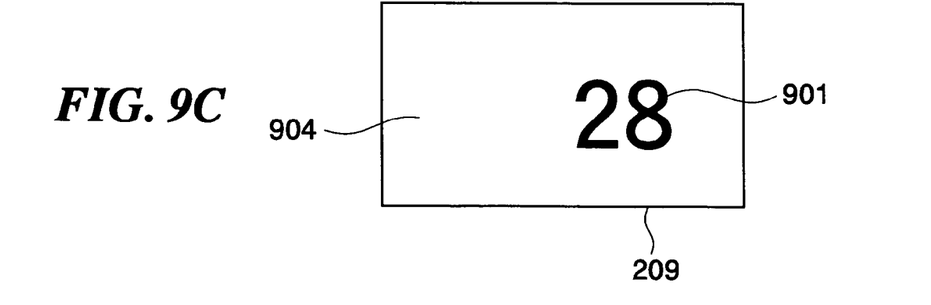
Figure 10:
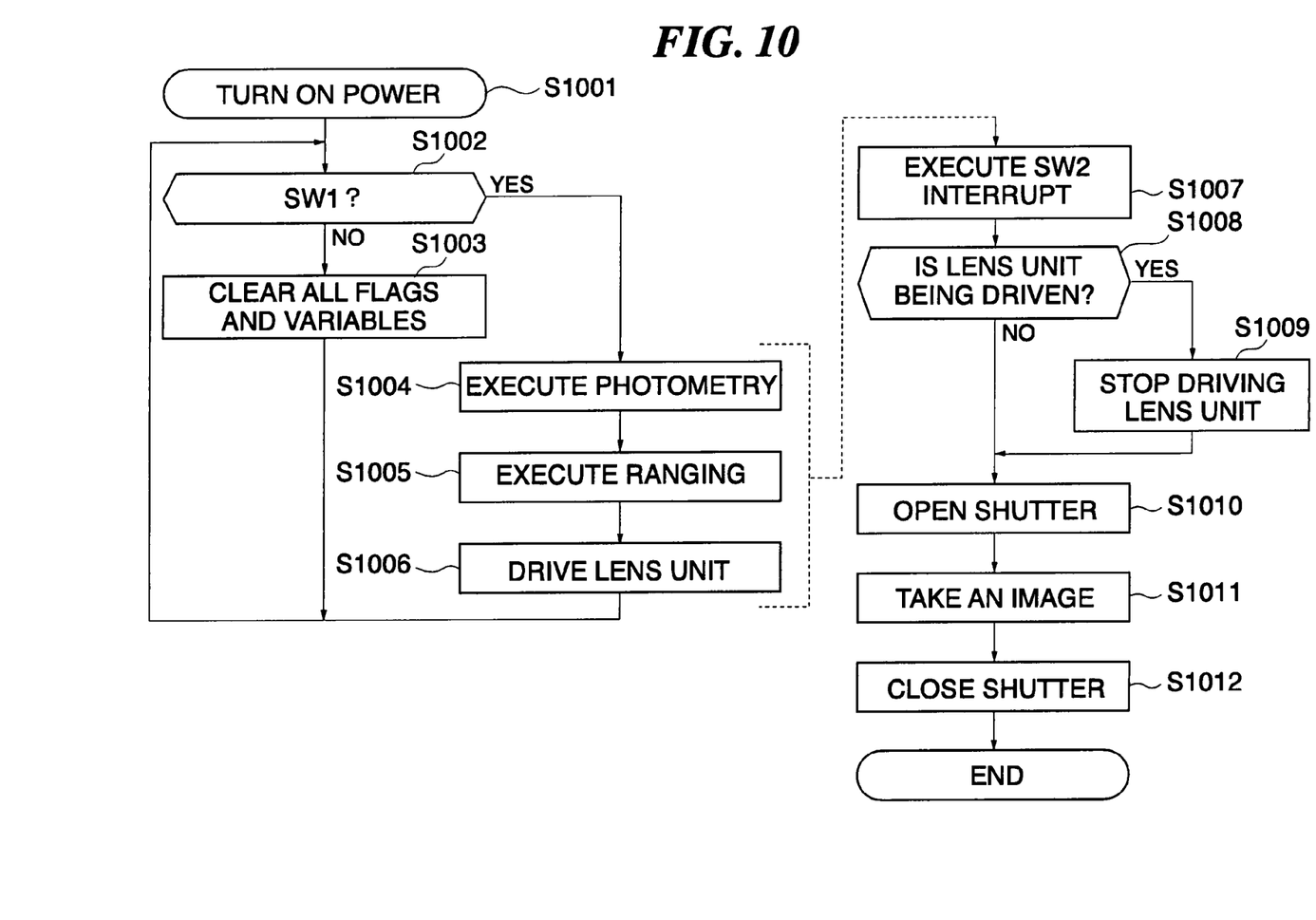
FIG. 10 is a flowchart showing a process executed by the camera in FIG. 1.
Figure 11:
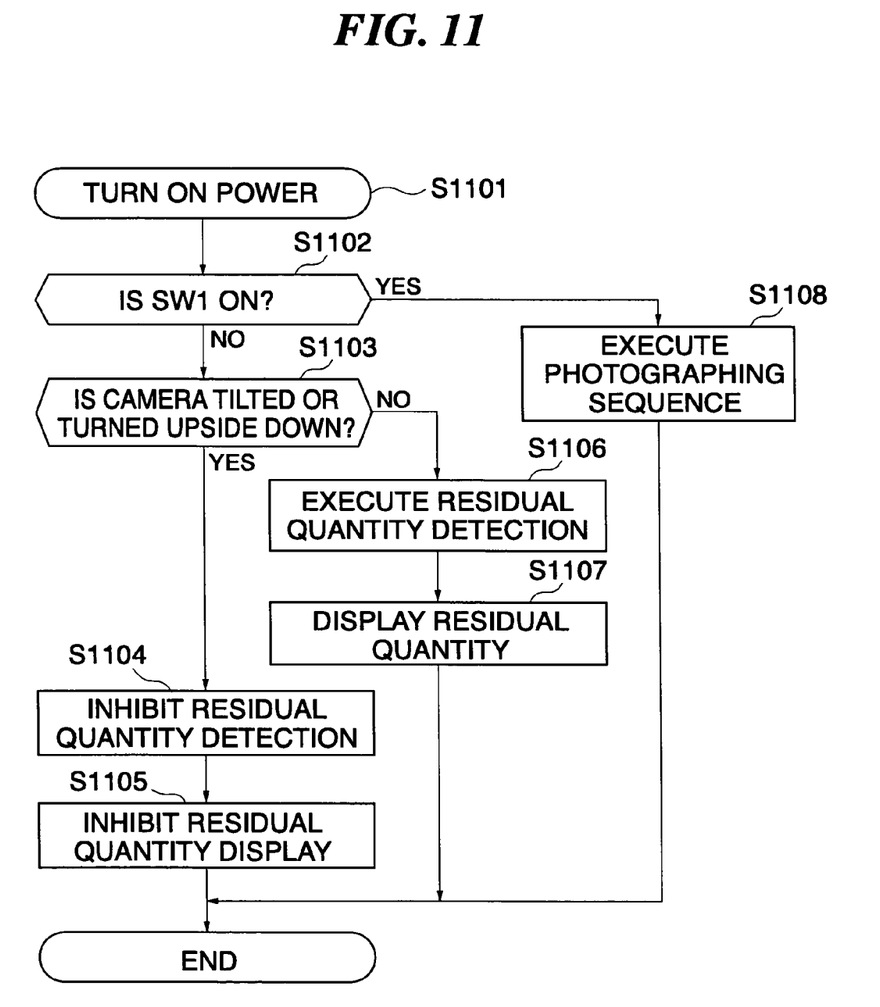
FIG. 11 is a flowchart showing a process executed by the fuel residual quantity detecting device.

FIG. 1 is a perspective view showing the appearance of a camera (image pickup apparatus) incorporating a fuel residual quantity detecting device as a liquid residual quantity detecting device according to the present embodiment. FIG. 2 is a block diagram showing the internal arrangement of the camera in FIG. 1. FIGS. 3 to 8 are schematic views useful in explaining the operation of the fuel residual quantity detecting device incorporated in the camera in FIG. 1. FIGS. 9A to 9C are views showing examples of display on a display section of the camera in FIG. 1. FIG. 10 is a flowchart showing a process executed by the camera, and FIG. 11 is a flowchart showing a process executed by the fuel residual quantity detecting device incorporated in the camera.

Referring to FIG. 1, a camera 100 is comprised of a camera housing 101, a lens barrel section 102, a view finder section 103, an electronic flash section 104, a release button 105, a display section 106 that displays information, and a fuel cell housing section, not shown, which is provided with a lid 107.

A fuel cell 108 is comprised of a storage section 109 that stores fuel (liquid) and water, air inlet ports 110, electric contacts 111 and 112 for connection to electric contacts of a power supply, not shown, of the camera 100.

Figure 3:
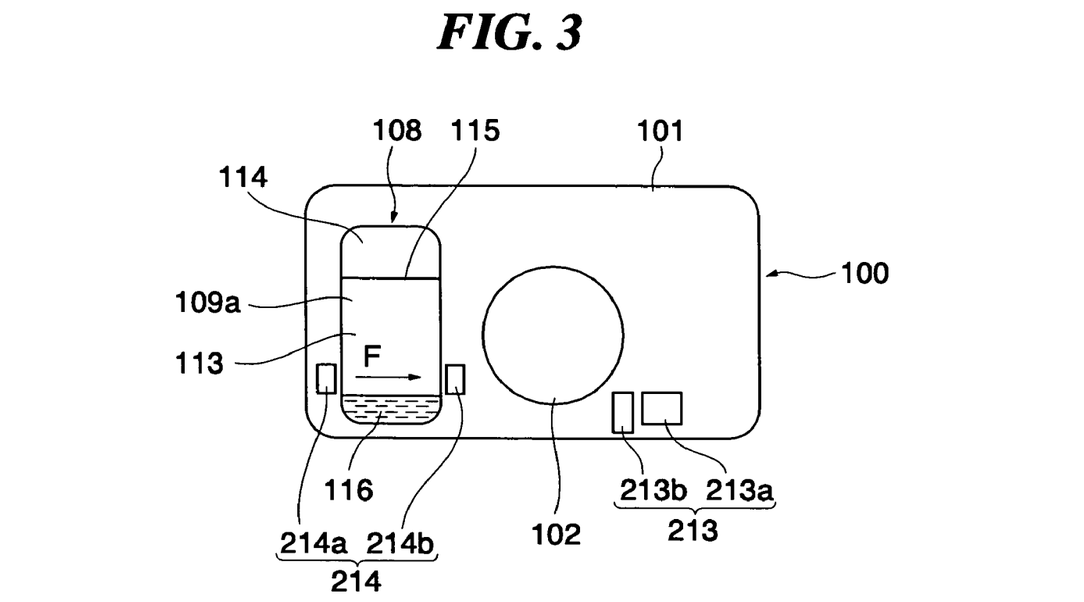
FIG. 3 is a schematic view useful in explaining the operation of the fuel residual quantity detecting device.
Figure 7:
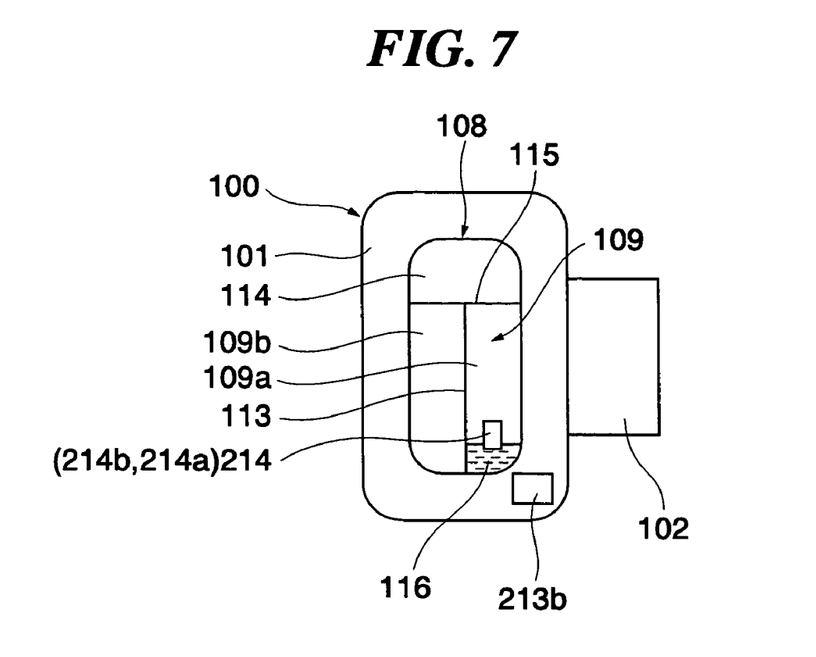
FIG. 7 is a schematic view useful in explaining the operation of the fuel residual quantity detecting device.

As shown in FIG. 7, the storage section 109 is divided by a partition wall 113 into a fuel storage chamber 109a that stores fuel and a water storage chamber 109b that stores water. Further, as shown in FIG. 7, a power generating section 114 is provided above the storage section 109. The power generating section 114 is isolated from the storage section 109 by a partition wall 115. A wall member defining the fuel storage chamber 109a is formed of a transparent material, and the fuel storage chamber 109a contains fuel (liquid) 116, such as alcohol, for power generation of the fuel cell 108, as shown in FIG. 3.

The principle of power generation by the fuel cell 108 has already been described under the paragraph "Description of the Related Art", and therefore description thereof is omitted here.

FIG. 2 is a block diagram showing the internal arrangement of the camera 100 in FIG. 1. In FIG. 2, reference numeral 201 designates a lens unit that captures an object image, reference numeral 202 an image pickup element (CCD) that converts an optical signal from the lens unit 201 into an electric signal, reference numeral 203 a digital signal processing circuit that processes an image signal from the image pickup element 202, reference numeral 204 an image signal processing circuit that processes an image signal from the digital signal processing circuit 203, and reference numeral 205 a microcomputer as a control means. The microcomputer 205 controls operation timing of the camera 100 and is also configured to read a signal from an operating member 212, referred to hereinafter, and so forth. Further, the microcomputer 205 is configured to provide control such that a fuel residual quantity-detecting operation is executed only when the camera 100 is in a predetermined position, e.g. in a normal position.

The microcomputer 205 may be configured to provide control such that execution of the fuel residual quantity-detecting operation is inhibited except when the camera 100 is in a predetermined position, e.g. in the normal position.

Reference numeral 206 designates a compression and expansion circuit that operates in synchronism with depression of the release button 105 (see FIG. 1) to compress image data and record the compressed image data in a recording memory 208, referred to hereinbelow, reference numeral 207 a work memory that is for use in data compression by the compression and expansion circuit 206, reference numeral 208 a recording memory which is implemented by a nonvolatile flash memory and reference numeral 209 a display section which is comprised of a backlit liquid crystal panel (LCD) and so forth, and used for displaying various kinds of information. The display section 209 corresponds to the display section 106 shown in FIG. 1. Reference numeral 210 designates a display section driving circuit which drives the display section 209 to display various kinds of information on a screen.

Figure 6:
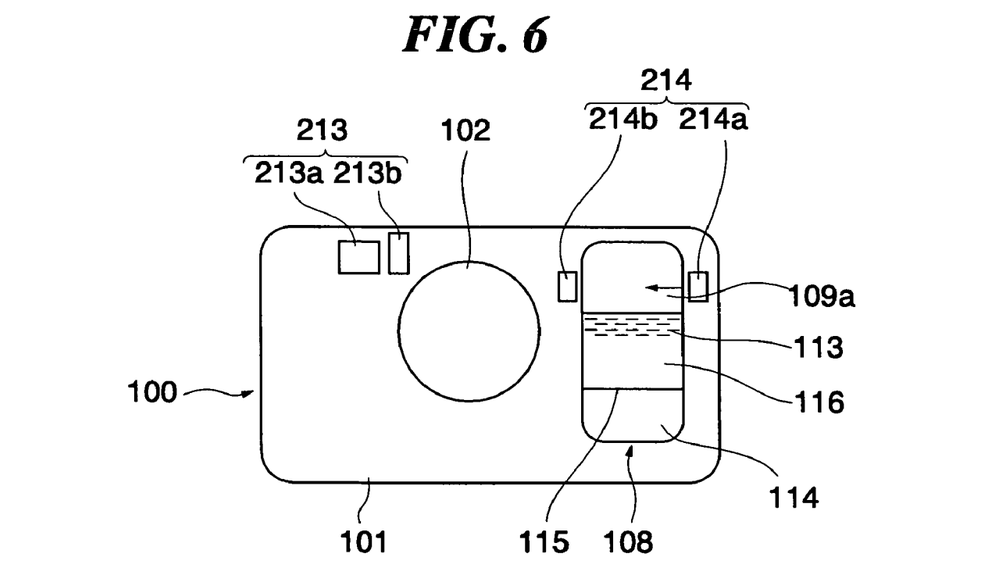
FIG. 6 is a schematic view useful in explaining the operation of the fuel residual quantity detecting device.

Reference numeral 211 designates a power supply circuit which serves as a power source for the camera 100, to supply electric power to various component units and elements. The operating member 212 including the release button 105 is used by the user to perform various operations. Reference numeral 213 designates a position detecting sensor unit (position detecting means). In the present embodiment, the position detecting sensor unit 213 is comprised of a first position detecting sensor 213a and a second position detecting sensor 213b, and is capable of detecting changes in the position of the camera 100 in multiple directions. As shown in FIG. 3, the first position detecting sensor 213a and the second position detecting sensor 213b are disposed in the camera housing 101 in a manner oriented in respective directions deviated from each other at right angles, and are configured so as to detect a position of the camera 100 as it is tilted in a lateral direction (i.e. in a state shown in FIG. 4) or in a front-rear direction (i.e. in a state shown in FIG. 8), as viewed from the front, or turned upside down as shown in FIG. 6.

Reference numeral 214 designates a fuel detecting sensor unit (liquid residual quantity detecting means). In the present embodiment, the fuel detecting sensor unit 214 is comprised of a light emitting element 214a and a light receiving element 214b, and is configured to detect the residual quantity (presence) of fuel (liquid) based on whether light F has been absorbed into the liquid fuel or has reached the light receiving element 214b. Therefore, a portion of the fuel cell 108 that contains fuel (i.e. the storage section 109) is formed of a transparent material.

As shown in FIG. 3, the fuel detecting sensor unit 214 is disposed such that the light emitting element 214a and the light receiving element 214b are positioned on laterally opposite sides of a lower part of the fuel storage chamber 109a. With this disposition of the fuel detecting sensor unit 214, when the residual quantity of the fuel 116 has decreased to or below a predetermined amount as shown in FIG. 3, the light F from the light emitting element 214a passes over the surface of the fuel 116 to be detected by the light receiving element 214b, which makes it possible to detect that the residual quantity of the fuel 116 has decreased to or below the predetermined amount or that the fuel 116 has run out. Further, if it is necessary to detect the decreasing state of the fuel 116 more precisely, the use of a plurality of fuel detecting sensor units 214 enables detection of the residual quantity of fuel in several levels.

FIG. 3 is a schematic view showing a state where the residual quantity of the fuel 116 has decreased below the predetermined amount and at the same time the camera 100 is in the normal position. In this state, the surface of the fuel 116 is lower than the light emitting element 214a and light receiving element 214b of the fuel detecting sensor unit 214, and therefore a space is created between opposed surfaces of the light emitting element 214a and the light receiving element 214b. This normal position of the camera 100 is detected by the position detecting sensor unit 213, and the microcomputer 205 provides control based on a signal indicative of the sensed position of the camera 100, such that the fuel residual quantity-detecting operation is executed. Since the light F from the light emitting element 214a reaches the light receiving element 214b without being absorbed into the fuel 116 when the camera 100 is detected to be in the normal position, it is possible to correctly detect that the residual quantity of the fuel 116 has decreased to or below the predetermined amount or that the fuel 116 has run out.

Figure 4:
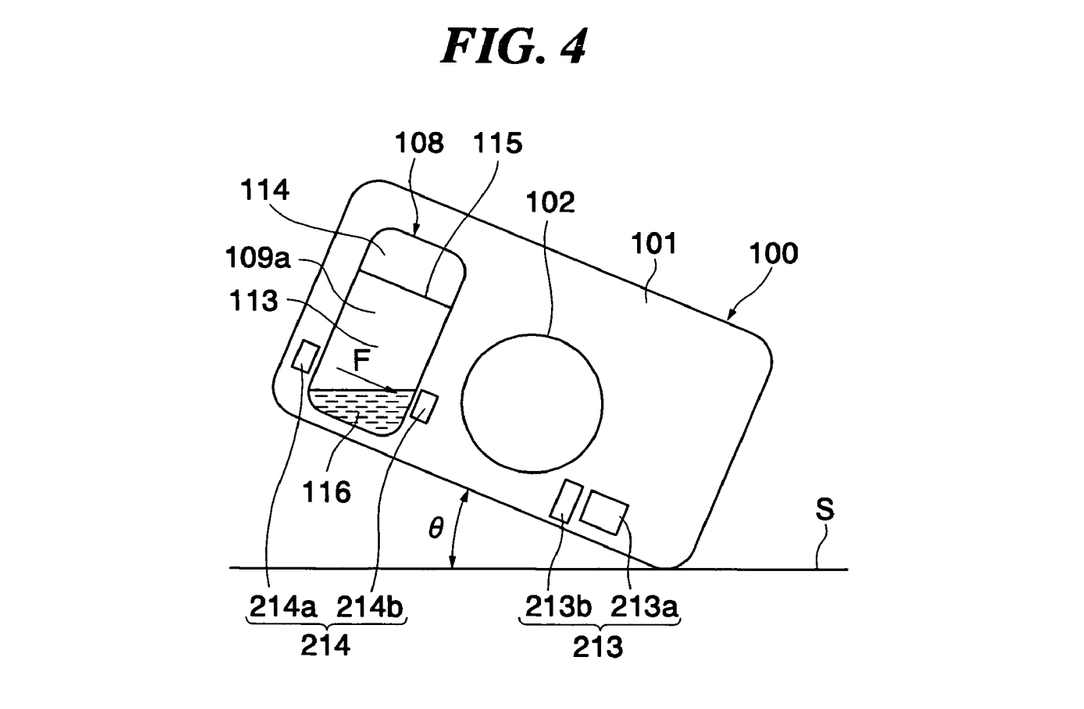
FIG. 4 is a schematic view useful in explaining the operation of the fuel residual quantity detecting device.

FIG. 4 is a schematic view showing a state where the camera 100 is tilted in the lateral direction through an angle of θ with respect to the horizontal surface S from the state shown in FIG. 3. In this state, the surface of the fuel 116 is positioned upward of the light receiving element 214b of the fuel detecting sensor unit 214. If the fuel residual quantity-detecting operation is carried out in this state, the light F from the light emitting element 214a of the fuel detecting sensor unit 214 is absorbed into the fuel 116 as it advances therein, before reaching the light receiving element 214b, and therefore the result of the detection will be displayed as "Fuel Remains" meaning that there is a sufficient residual quantity of fuel 116, even though in actuality, the residual quantity of the fuel 116 has decreased below the predetermined amount.

To avoid this, as shown in FIG. 4, when the camera 100 is tilted in the lateral direction through the angle of θ from the horizontal surface S or through an angle greater than the angle θ, the position detecting sensor unit 213 detects the lateral inclination of the camera 100 with respect to the horizontal surface S, and the microcomputer 205 provides control based on the signal indicative of the sensed position of the camera 100 so as to inhibit execution of the fuel residual quantity-detecting operation.

Figure 5:
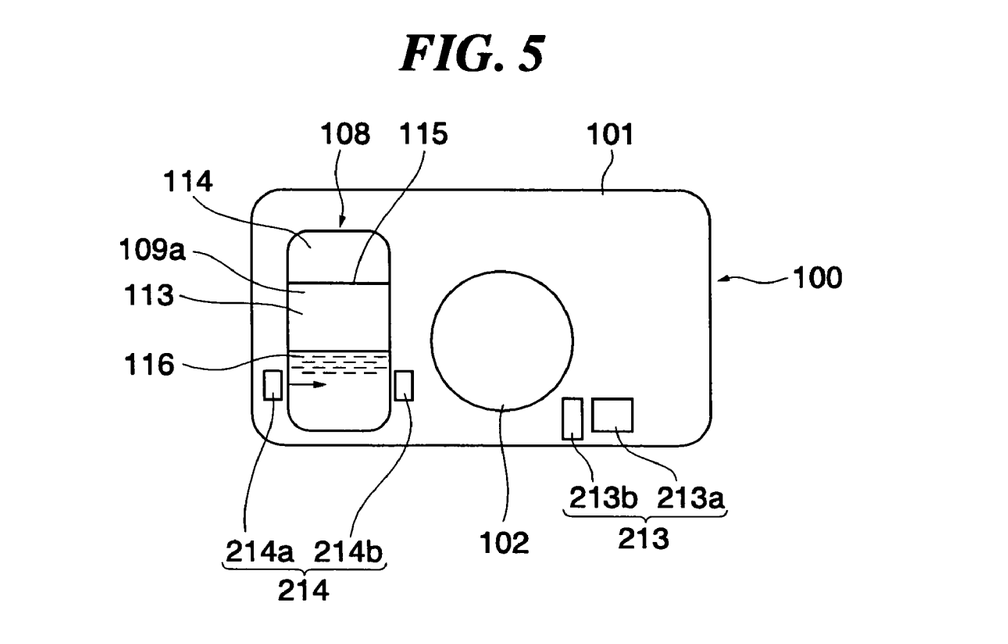
FIG. 5 is a schematic view useful in explaining the operation of the fuel residual quantity detecting device.

FIG. 5 is a schematic view showing a state where more than the predetermined mount of fuel 116 is stored in the fuel storage chamber 109a and the camera 100 is in the normal position. In this state, the surface of the fuel 116 is positioned upward of the light emitting element 214a and light receiving element 214b of the fuel detecting sensor unit 214, and therefore no space is created between the opposed surfaces of the light emitting element 214a and the light receiving element 214b. This normal position of the camera 100 is detected by the position detecting sensor unit 213, and the microcomputer 205 provides control based on the signal indicative of the sensed position of the camera so as to permit the fuel residual quantity-detecting operation to be executed. Since the light F from the light emitting element 214a is absorbed into the fuel 116 before reaching the light receiving element 214b when the camera 100 is detected to be in the normal position, it is possible to correctly detect that there is a sufficient residual quantity of fuel 116.

When the camera 100 is turned upside down from the state shown in FIG. 5 into a state shown in FIG. 6, the surface of the fuel 116 is positioned downward of the light emitting element 214a and light receiving element 214b of the fuel detecting sensor unit 214, and therefore a space is created between the opposed surfaces of the light emitting element 214a and the light receiving element 214b. This state allows the light F from the light emitting element 214a to reach the light receiving element 214b without being absorbed into the fuel 116. If the fuel residual quantity-detecting operation is carried out in this state, the result of the detection will show that no fuel 116 remains, even though in actuality, there is a sufficient residual quantity of fuel 116 in the fuel storage chamber.

To avoid this, when the camera 100 is turned upside down as shown in FIG. 6, the position detecting sensor unit 213 detects that the camera 100 has been turned upside down, and the microcomputer 205 provides control based on the signal indicative of the sensed position of the camera 100 so as to inhibit execution of the fuel residual quantity-detecting operation.

FIG. 7 is a schematic view showing the camera 100, as viewed from a lateral side thereof, in the same state as shown in FIG. 3.

Figure 8:
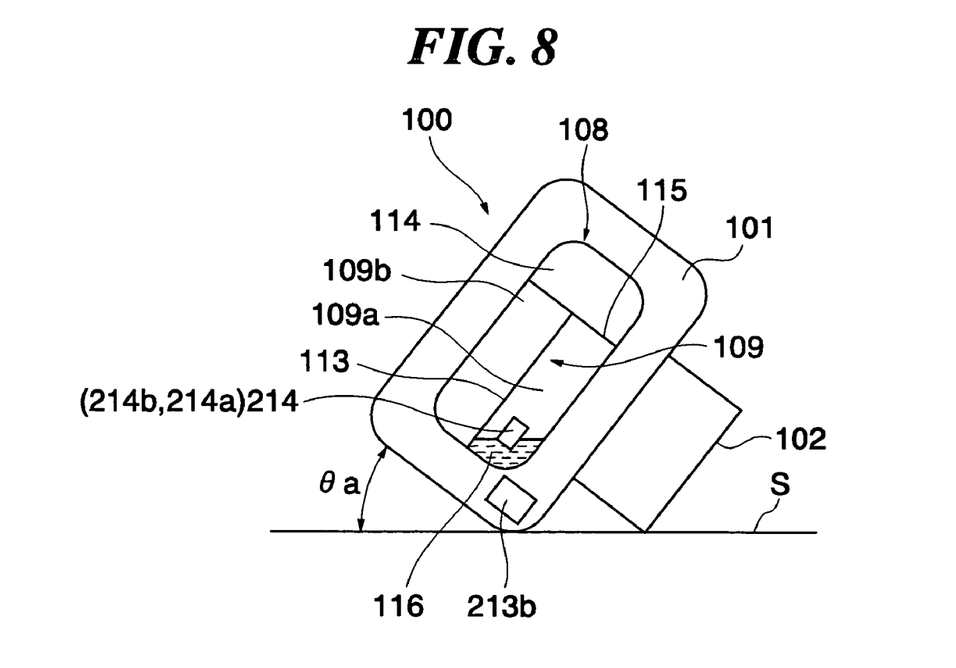
FIG. 8 is a schematic view useful in explaining the operation of the fuel residual quantity detecting device incorporated in the camera in FIG. 1.

When the camera 100 is tilted from this state through an angle of θa toward the lens barrel section 102 (front-rear direction) as shown in FIG. 8 or through an angle greater than the angle θa, the surface of the fuel 116 is positioned upward of the light emitting element 214a and light receiving element 214b of the fuel detecting sensor unit 214, and therefore the light F from the light emitting element 214a is absorbed into the fuel 116 before reaching the light receiving element 214b. If the fuel residual quantity-detecting operation is carried out in this state, the result of the detection will be displayed as "Fuel Remains" meaning that there is a sufficient residual quantity of fuel 116, even though in actuality, the residual quantity of the fuel 116 is small.

To avoid this, when the camera 100 is tilted in the front-rear direction with respect to the horizontal surface S as shown in FIG. 8, the position detecting sensor unit 213 detects the inclination of the camera 100 in the front-rear direction, and the microcomputer 205 provides control based on the signal indicative of the sensed position of the camera 100 so as to inhibit execution of the fuel residual quantity-detecting operation.

The accuracy in detecting the residual quantity of fuel can be enhanced by coloring the fuel 116.

FIGS. 9A to 9C are views showing examples of display on the display section 209 in response to detection of the fuel residual quantity. In FIGS. 9A to 9C, reference numeral 901 designates the number of photographs taken by the camera 100, reference numeral 902 an indication that there is a sufficient residual quantity of fuel, reference numeral 903 an indication that the residual quantity of the fuel has become small or the fuel has run out, and reference numeral 904 an indication that the fuel residual quantity detection is not being performed.

The examples in FIGS. 9A, 9B, and 9C show that there is a sufficient residual quantity of fuel, that the residual quantity of the fuel has become small or the fuel has run out, and that the fuel residual quantity detection is not being performed, respectively.

When the fuel residual quantity detection is not performed, as shown in FIG. 9C, display of an indication as to whether there is some residual fuel is inhibited. Otherwise, the indication of either "Fuel Remains" or "No Fuel" as the result of the immediately preceding detection of the fuel residual quantity is continuously displayed, which can lead to the user making an erroneous judgment on the residual quantity of the fuel. When the fuel residual quantity-detecting operation is not executed, it may be envisaged that information indicating that the result of the fuel residual quantity detection is erroneous or that execution of the fuel residual quantity-detecting operation is not allowed is displayed on the display section 209. In this case, however, the user can overlook the fuel residual quantity information unless he always gazes at the display section 209, and can easily misjudge the fuel residual quantity e.g. when in a hurry.

Next, a detailed description will be given of the operation of the camera 100 and the operation of the fuel residual quantity detecting device according to the present embodiment incorporated in the camera 100, with reference to FIGS. 10 and 11.

FIG. 10 is a flowchart showing a process executed by the camera 100 for a photographing operation, and FIG. 11 is a flowchart showing a process executed by the fuel residual quantity detecting device for fuel residual quantity detection.

Referring first to FIG. 10, first, when the user operates the operating member 212 of the camera 100, a power switch, not shown, is turned on in a step S1001. In the following step S1002, it is determined whether or not a first stroke switch (SW1) of the release button 105 has been turned on (i.e. whether a first-step operation of the release button 105 is executed). If the first stroke switch (SW1) of the release button 105 has not been turned on, the process proceeds to a step S1003, and control flag variables set in a RAM (Random Access Memory), not shown, of the microcomputer 205 are all cleared and initialized, followed by the process returning to the step S1002.

The steps S1002 and S1003 are repeatedly executed until the first stroke switch (SW1) of the release button 105 is turned on or the power switch is turned off.

On the other hand, if it is determined in the step S1002 that the first stroke switch (SW1) of the release button 105 has been turned on, the process proceeds to a step S1004, wherein a "photometry" subroutine for exposure control is executed. In this step, the microcomputer 205 calculates an optimum shutter control value and an optimum aperture control value based on an output from an exposure sensor, not shown. These calculated values are used during a release operation, for shutter control and aperture control.

Next, a "ranging" subroutine is executed in a step S1005. Then, in a step S1006, the microcomputer 205 drives the lens unit 201 based on an image signal from a focus detecting sensor, not shown, and performs computation so as to output an optimum signal. Thereafter, the microcomputer 205 stops driving the lens unit 201, followed by the process returning to the step S1002. Then, the steps S1004 to S1006 are repeatedly executed until the first stroke switch (SW1) is turned off or a second stroke switch (SW2) of the release button 105 is turned on, whereby focus adjustment is performed in a manner appropriate even for a moving object.

When the release button 105 is further depressed to turn the second stroke switch (SW2) on, the process immediately proceeds to a step S1007 whichever step may be being executed, due to an interrupt function. In the step S1007, a release operation is started. Next, it is determined in a step S1008 whether or not the lens unit 201 is being driven. If the lens unit 201 is being driven, the process proceeds to a step S1009, wherein a driving stop command for the lens unit 201 is issued to stop driving the lens unit 201, followed by the process proceeding to a step S1010. On the other hand, if it is determined in the step S1008 that the lens unit 201 is not being driven, the process immediately proceeds to the step S1010.

In the step S1010, the shutter is opened, and in the following step S1011, an image is taken over a preset shutter time. Then, the shutter is closed in a step S1012, followed by terminating the sequential photographing operations.

Thereafter, the user moves the finger off the release button 105 to release the release button 105 again. Thus, photographing is completed.

Referring next to FIG. 11, first, the process executed by the fuel residual quantity detecting device for detecting the residual quantity of fuel will be described. After the power switch of the camera 100 in a step S1101 is turned on, it is determined in a step S1102 whether or not the first stroke switch (SW1) of the release button 105 has been turned on. If the first stroke switch (SW1) of the release button 105 has been turned on, the process proceeds to a step S1108, and the photographing sequence (step S1004 et seq. in FIG. 10) is executed, followed by terminating the present process.

On the other hand, if it is determined in the step S1102 that the first stroke switch (SW1) of the release button 105 has not been turned on, the process proceeds to a step S1103, wherein it is determined, based on an output from the position detecting sensor unit 213, whether the camera 100 is tilted or positioned upside down. If the camera 100 is tilted or positioned upside down, the process proceeds to a step S1104, wherein the fuel detecting sensor unit 214 is turned off to thereby inhibit execution of the fuel residual quantity-detecting operation. Next, the process proceeds to a step S1105, wherein the residual quantity display area of the display section 209 is turned off. The display state of the display section 209 in this state is shown in FIG. 9C. After execution of the step S1105, the present process is terminated.

On the other hand, if it is determined in the step S1103 that the camera 100 is not tilted or positioned upside down, the process proceeds to a step S1106, wherein the fuel residual quantity-detecting operation is executed by driving the fuel detecting sensor unit 214, so as to determine whether or not there is residual fuel. Then, in the following step S1107, the result of the determination is displayed on the display section 209. At this time, if there is a sufficient residual quantity of fuel 116, the result of the determination is displayed as shown in FIG. 9A, whereas if the residual quantity of the fuel 116 is small, the result of the determination is displayed as shown in FIG. 9B.

As described above, according to the present embodiment, since the residual quantity detecting operation for the fuel 116 is executed only when the camera 100 is in a predetermined position, the fuel residual quantity-detecting operation can be carried out without being affected by the position of the camera 100, which makes it possible to prevent the user from carelessly or erroneously judging that the residual quantity of the fuel 116 has decreased to or below the predetermined amount or that the fuel has run out.

Further, the camera 100 performs the fuel residual quantity-detecting operation while it is in its normal position, which increases the ratio of the time period over which the residual quantity of the fuel 116 is detected to the total time period during the use of the camera 100, and hence constantly gives the user correct information of the fuel residual quantity.

Furthermore, the fuel residual quantity-detecting operation is not executed except when the camera 100 is in the normal position, which makes it possible to prevent the user from making an erroneous judgment on the fuel residual quantity after carelessly glancing at a content displayed on the display section 209. In addition, the fuel detecting sensor unit 214 is not energized unless the camera is in the predetermined position, which makes it possible to obtain an energy-saving effect. Particularly, during the photographing sequence, execution of the fuel residual quantity-detecting operation is inhibited, whereby erroneous detection of the residual quantity of the fuel 116 can be prevented even when the camera 100 is tilted during photographing.

Further, the position of the camera 100 is detected not only in the lateral direction but also in the front-rear direction, whereby the fuel residual quantity detection at almost all positions of the camera 100 other than the normal position can be prevented.

Moreover, when the fuel residual quantity-detecting operation is not being performed, no indication of the fuel residual quantity is given on the display section 209 so as to prevent the user from viewing incorrect information and making an erroneous judgment on the fuel residual quantity.

The present invention is not limited to the above described embodiment, but can be modified in various manners based on the subject matter of the present invention, which should not be excluded from the scope of the present invention.

Further, the present invention can be applied not only to detection of the residual quantity of a liquid fuel in a fuel cell for power generation, but it is widely applicable to detection of the residual quantity of any other liquid.

Further, it is to be understood that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and the storage medium in which the program code is stored constitute the present invention.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, the above program has only to realize the functions of the above described embodiment on a computer, and the form of the program may be an object code, a program code executed by an interpreter, or script data supplied to an OS.

Examples of the storage medium for supplying the program code include a floppy (registered trademark) disk, a flexible disk, a hard disk, an optical disk, a magnetic-optical disk, a CD-ROM, a CD-R, a CD-RW, a DVD-ROM, a DVD-RAM, a DVD-RW, or a DVD+RW, a magnetic tape, a nonvolatile memory card, and a ROM.

Alternatively, the program may be downloaded via a network from another computer, a database, or the like, not shown, connected to the Internet, a commercial network, a local area network, or the like.

CROSS REFERENCE TO RELATED APPLICATION

This application claims priority from Japanese Patent Application No. 2003-413859 filed Dec. 11, 2003, which is hereby incorporated by reference herein.

What is claimed is:

1. A method of detecting a residual quantity of a liquid stored in a liquid storage section provided in a compact electronic apparatus, comprising:
   a position detecting step of detecting a position of the apparatus in multiple directions; and
   a control step that detects and displays said liquid residual quantity when said position detecting step indicates that the apparatus is in a normal position; and
   a control step that inhibits the detection of said liquid residual quantity when said position detecting step indicates that the apparatus is in a reverse position in which the apparatus in turned upside down with respect to a normal position.

2. A liquid residual quantity detecting method as claimed in claim 1, wherein the liquid is a liquid fuel used by a fuel cell as a power supply for the apparatus to generate electric power.

3. A liquid residual quantity detecting method as claimed in claim 1, wherein the apparatus is an image pickup apparatus.

4. A liquid residual quantity detecting method as claimed in claim 1, wherein the apparatus is a portable apparatus.

5. A device for detecting a residual quantity of a liquid storage section provided in a compact electronic apparatus, comprising:
   a position detector that detects a position of the apparatus in multiple directions; and
   a controller that detect and displays said liquid residual quantity when said position detecting step indicates that the apparatus is in a normal position; and
   a controller that inhibits the detection of said liquid residual quantity when said position detector indicates that the apparatus is in a reverse position in which the apparatus is turned upside down with respect to a normal position.

6. A liquid residual quantity detecting device as claimed in claim 5, wherein the liquid is a liquid fuel used by a fuel cell as a power supply for the apparatus to generate electric power.

7. A liquid residual quantity detecting device as claimed in claim 5, wherein the apparatus is an image pickup apparatus.

8. A liquid residual quantity detecting device as claimed in claim 5, wherein the apparatus is a portable apparatus.

* * * * *